Patented July 11, 1950

2,514,955

UNITED STATES PATENT OFFICE 2,514,955

MANUFACTURE OF SULFAMATES

Jonas Kamlet, New York, N. Y., assignor to Mathieson Chemical Corporation, a corporation of Virginia No Drawing. Application February 13, 1948, Serial No. 8,285

11 Claims. (Cl. 23—114)

The present invention relates to a process for the manufacture of sulfamates. More particularly, it relates to a process whereby the salts of sulfamic acid —HOSO₂NH₂—, particularly ammonium sulfamate, can be manufactured from cheap and readily obtainable raw materials.

Sulfamic acid was first described by Rose (Pogg. Ann. 33, 235 (1834); ibid, 42, 415 (1837); ibid, 61, 397 (1844) and Berglund (Lunds Univ. Acta 13, 4 (1875) who prepared it by decomposing lead imidosulfonate with hydrogen sulfide. It was not until the discovery that sulfamic acid could be prepared in good yields by the reaction of urea with chlorsulfonic acid (Wyler—U. S. Patent 2,109,952 (1938) or with fuming sulfuric acid of varying strengths (Baumgarten—U. S. Patent 2,102,350 (1937); Cupery—U. S. Patent 2,191,754 (1940); Hill and Peirce—U. S. Patent 2,390,648 (1945) that this inorganic acid and its salts became commercially important. Sulfamic acid and sulfamate salts now enjoy a wide field of industrial applicability (Cupery and Gordon, Industrial and Engineering Chemistry, 34, 792 (July 1942).

Although urea is now being manufactured in large tonnages, it is still a relatively expensive and at times unavailable industrial raw material. Many attempts have been made to obviate the use of urea in the manufacture of sulfamates, but none of these have been commercially successful to the present time. Thus, the I. G. Farbenindustrie (German Patents 562,738 (1931) and 668,142 (1938) describe the reaction of sulfur trioxide with ammonia to obtain a product which is predominantly ammonium imidodisulfonate —NH(SO₂ONH₄)₂— and contains little or no ammonium sulfamate —NH₂SO₂ONH₄. Tauch (U. S. Patent 2,426,420 (1947) finds it necessary to react a huge excess of liquid ammonia (144 parts) with solid sulfur trioxide (1 part) in order to obtain an impure ammonium sulfamate which still contains considerable quantities of ammonium imidodisulfonate and ammonium sulfate.

It is the purpose of this invention to provide a process for the manufacture of sulfamates, particularly ammonium sulfamate, the substantial effect of which is to yield these compounds as the result of an over-all reaction which may be represented as follows:

It is the further purpose of this invention to provide a process whereby ammonium sulfate can be prepared in a pure state, substantially free of concomitant ammonium imidodisulfonate and ammonium sulfate, and in good yield from the theoretical proportions of two moles of ammonia and one mole of sulfur trioxide.

The basis of the present invention is the following sequence of steps:

(a) Into a cooled, agitated body of a liquid, anhydrous tertiary amine, devoid of free hydroxyl, amino or imino group substituents, sulfur trioxide is introduced, whereby the anhydro-N-sulfonic acid of the tertiary amine is formed and usually precipitated. The introduction of the sulfur trioxide is discontinued before one mole of SO₃ has been reacted with each mole of tertiary amine, and preferably when from 0.05 to 0.50 moles of SO₃ has been introduced per mole of tertiary amine. There is thus obtained a mixture of anhydro-N-sulfonic acid of the tertiary amine and excess tertiary amine, which excess amine serves as a solvent, diluent, reaction medium and heat exchange agent.

(b) Anhydrous ammonia is now passed into the cooled, agitated reaction mixture until from one to two moles of ammonia have been introduced per mole of sulfur trioxide reacted in the first step. The first mole of ammonia serves to convert the tertiary amine anhydro-N-sulfonic acid to the tertiary amine salt of sulfamic acid. The second mole of ammonia reacts with the tertiary amine sulfamate to yield ammonium sulfamate and regenerate the original tertiary amine base. Thus, if one mole of NH₃ is introduced per mole of SO₃, the reaction mixture will now consist of a mixture of tertiary amine sulfomate and excess tertiary amine. If two moles of ammonia are introduced per mole of SO₃, the reaction mixture will now consist of a mixture of ammonium sulfamate and tertiary amine.

(c—1) The mixture of tertiary amine sulfamate and excess tertiary amine may now be reacted with a hydroxide, carbonate or bicarbonate of an alkali metal, or with an oxide or hydroxide of an alkali-earth metal, either in the dry state or in aqueous solution or suspension, whereby the tertiary amine sulfamate is converted to the alkali metal or alkali-earth metal sulfamate, and all of the original tertiary amine may be recovered (as e. g. by distillation, by steam distillation, etc.); or (c—2) The mixture of ammonium sulfamate and tertiary amine is filtered or separated by any convenient means (e. g. centrifuging, settling and decantation, etc.). The ammonium sulfamate is freed of concomitant traces of tertiary amine by drying and the recovered tertiary amine, representing substantially all of the original starting material, is returned to the process without further treatment being necessary. Small amounts of ammonium sulfamate left in the tertiary amine are completely unobjectionable, do not interfere with the re-use of the amine and are recoverable in subsequent cycles.

It has been known that sulfur trioxide will react with tertiary amines to form adducts which may be characterized chemically as the anhydro-N-sulfonic acids of the tertiary amines (German Patents 499,571; 514,821; 525,814; 535,147; British Patents 294,507; 317,736; French Patent 667,864; U. S. Patents 1,835,841; 1,921,497; Sisler and Audrieth—Journal of the American Chemical Society 61, 3392-3 (1939); Inorganic Syntheses, volume II, pages 173-5; Baumgarten, Berichte, 59, 1976 (1926). I have found that this type of adduct can be formed with any liquid, anhydrous tertiary amine, whether it be aliphatic, aromatic, carboxylic, heterocyclic, et cetera, and which does not contain free hydroxyl, amino or imino group substituents in its molecular structure. Tertiary amines which do contain such substituents are liable to sulfonate on the hydroxyl, amino or imino group rather than form the adduct on reaction with sulfur trioxide.

Typical examples of tertiary amines suitable for use in this process are pyridine, alpha-picoline, beta-picoline, gamma-picoline, 2,6-lutidine, N,N-dimethylaniline, N,N-diethylaniline, N,N-benzyldimethylamine, et cetera. Mixtures of tertiary amines are also quite suitable. Thus, the mixture of 35% of beta-picoline, 35% of gamma-picoline and 30% of 2,6-lutidine, boiling at 143° to 146.5° C. and available industrially as the picoline-lutidine cut of coal-tar bases, is a comparatively plentiful and inexpensive source of the tertiary amines suitable for use in the present process.

The sulfur trioxide is introduced into the body of the teritary amine with good agitation and with continual cooling. The formation of the adduct is an exothermic reaction and the excess of tertiary amine serves the useful purposes of providing a mixable slurry of the anhydro-N-sulfonic acid of the tertiary amine, facilitating the cooling of the reaction mixture and preventing the caking or solidification of the adduct. The temperature of the reaction mixture is not critical, but I have found it desirable to keep it below 30° C., and preferably around 10° C. by cooling and moderating the rate of addition of the reagents to avoid excessively violent reactions and to obviate losses of reagents by volatilization.

The sulfur trioxide may be introduced in any convenient manner: as gas from the contact converter of a sulfuric acid plant, as gas evolved by the heating of fuming sulfuric acid, as the stable solid alpha-form (M. P. 62.3° C.), as the meta-stable asbestos-like beta-form (M. P. 32.5° C.), as the meta-stable liquid or ice-like gamma-form (M. P. 16.8° C.) or as any other convenient form or mixture of forms, or as a compound or mixture of compounds yielding sulfur trioxide under the conditions of the reaction.

In the second step, the ammonia may be introduced as the anhydrous gas, or as anhydrous liquid ammonia. Here again, it is desirable to cool the reaction mixture efficiently since the reaction of the ammonia with the anhydro-N-sulfonic acid of the tertiary amine is exothermic. A reaction temperature kept below 30° C., and preferably about 10° C., is desirable for the reasons indicated above. However, these temperatures are by no means critical. The presence of water in the reaction mixture is undesirable for obvious reasons. The sulfur trioxide will react with the water to form sulfuric acid, which the tertiary amine will neutralize as tertiary amine sulfate. The latter will react with ammonia and the end-product will be contaminated with ammonium sulfate to the extent that the original reagents contained water.

The preferred embodiment of this process reacts two moles of ammonia with each mole of the tertiary amine anhydro-N-sulfonic acid. There is thus obtained ammonium sulfamate and the original tertiary amine is regenerated and returned to the process (with small additions of tertiary amines to make up for mechanical losses). Using pyridine as a typical tertiary amine, the process may thus be represented:

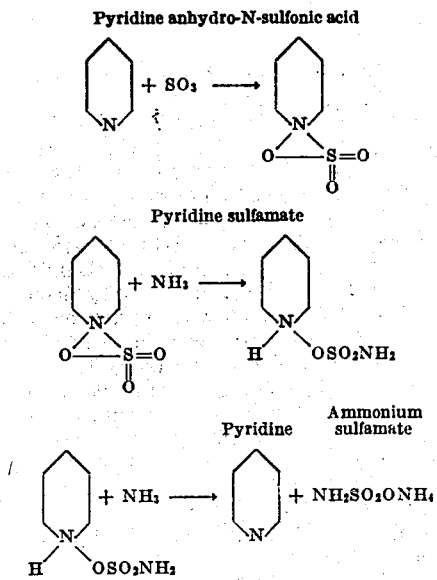

Under this embodiment, the ammonium sulfamate is the starting point for all other salts of sulfamic acid and for sulfamic acid proper. It may be converted to the corresponding alkali metal or alkali-earth metal sulfamates (e. g. by reaction with alkali metal hydroxide, carbonate or bicarbonate or by reaction with alkali-earth metal oxide or hydroxide). Sulfamic acid is conveniently prepared by reacting an alkali-earth metal sulfamate solution with the theoretical amount of sulfuric acid, separating the insoluble alkali-earth metal sulfate and crystallizing the sulfamic acid from the filtrate.

It will thus be observed that the over-all effect of this process is to obtain ammonium sulfamate by the reaction of close to the theoretical proportions of sulfur trioxide and ammonia. The only other raw material consumed in this process are the small amounts of tertiary amine lost by mechanical manipulation, drying of the ammonium sulfamate, et cetera, during each cycle. These losses can be kept at a minimum by efficient operation and by condensation of the tertiary amine volatilized during the drying of the ammonium sulfamate. One hundred pounds of ammonium sulfamate are obtained by this process from seventy pounds of sulfur trioxide and thirty pounds of ammonia.

The following examples are given to define and to illustrate the present invention but in no ways to limit it to reagents, proportions or conditions described therein. Obvious modifications will occur to any person skilled in the art. All parts given are parts by weight.

Example I

Into 8000 parts of technical pyridine (100 moles), pass 1600 parts of sulfur trioxide gas (20 moles) from a contact sulfuric acid converter, while mixing continuously and with efficient cooling, the temperature of the reaction mixture being kept below 30° C., and preferably at around 10° C., by regulating the rate of addition to the $SO_3$ and by the cooling. Now pass gaseous anhydrous ammonia into the well-cooled agitated reaction mixture (continuing to maintain the temperature below 30° C., and preferably at about 10° C., as before) until 680 parts of ammonia (40 moles) have been absorbed. Filter off the precipitate of ammonium sulfamate and return the filtrate of pyridine to the process. The ammonium sulfamate is dried, preferably under reduced pressure at a temperature not in excess of 125° C. The yield of ammonium sulfamate is 2260 to 2270 parts, close to the theoretical.

Example II

To 9750 parts of technical picoline-lutidine coal tar base cut (35% beta-picoline, 35% gamma-picoline, 30% 2,6-lutidine) (100 moles), add slowly in small portions a total of 2400 parts of alpha-form solid sulfur trioxide (30 moles), while mixing continuously and maintaining the reaction temperature below 30° C. by efficient cooling. Now pass liquid anhydrous ammonia into the agitated, cooled reaction mixture from a cylinder, continuing to maintain the temperature below 30° C., until a total of 1020 parts of ammonia have been added. Filter off the precipitate of ammonium sulfamate, and return the coal tar base filtrate to the process. The ammonium sulfamate is dried under reduced pressure at a temperature not in excess of 125° C. The yield is 3400 to 3410 parts, or close to the theoretical.

Having described my invention, what I claim and desire to protect by Letters Patent is:

1. A process for the manufacture of sulfamates which comprises reacting a liquid, anhydrous tertiary amine, devoid of hydroxyl, amino or imino group substituents, with sulfur trioxide in quantity insufficient to form an adduct with all of the tertiary amine and reacting the resultant mixture of anhydro-N-sulfonic acid of tertiary amine and tertiary amine with anhydrous ammonia.

2. A process for the manufacture of sulfamates which comprises reacting a liquid, anhydrous tertiary amine, devoid of hydroxyl, amino or imino group substituents, with sulfur trioxide in quantity insufficient to form an adduct with all of the tertiary amine and reacting the resultant mixture of anhydro-N-sulfonic acid of tertiary amine and tertiary amine with from one to two moles of anhydrous ammonia per mole of sulfur trioxide originally reacted.

3. A process for the manufacture of sulfamates which comprises reacting a liquid, anhydrous tertiary amine, devoid of hydroxyl, amino or imino group substituents, with from 0.05 to 0.50 moles of sulfur trioxide per mole of tertiary amine, reacting the resultant mixture of anhydro-N-sulfonic acid of tertiary amine and tertiary amine with from one to two moles of anhydrous ammonia per mole of sulfur trioxide originally reacted and separating the resultant sulfamate salt from tertiary amine.

4. A process for the manufacture of ammonium sulfamate which comprises reacting a liquid, anhydrous tertiary amine, devoid of hydroxyl, amino or imino group substituents, with from 0.05 to 0.50 moles of sulfur trioxide per mole of tertiary amine, reacting the resultant mixture of anhydro-N-sulfonic acid of tertiary amine and tertiary amine with two moles of anhydrous ammonia per mole of sulfur trioxide originally reacted and separating the resultant ammonium sulfamate from tertiary amine.

5. The process described in claim 4 in which the tertiary amine is pyridine.

6. The process described in claim 4 in which the tertiary amine is a picoline-lutidine fraction of coal tar bases.

7. The process described in claim 4 in which the tertiary amine is N,N-dimethylaniline.

8. In a process for the manufacture of sulfamates, the step which comprises reacting a mixture of anhydro-N-sulfonic acid of tertiary amine and tertiary amine with from one to two moles of anhydrous ammonia per mole of the anhydro-N-sulfonic acid of tertiary amine.

9. In a process for the manufacture of ammonium sulfamate, the step which comprises reacting a mixture of anhydro-N-sulfonic acid of tertiary amine and tertiary amine with two moles of anhydrous ammonia per mole of the anhydro-N-sulfonic acid of the tertiary amine.

10. In a process for the manufacture of sulfamates, the step which comprises converting an anhydro-N-sulfonic acid of a tertiary amine to the corresponding tertiary amine sulfamate by reaction with an equimolecular quantity of anhydrous ammonia.

11. In a process for the manufacture of ammonium sulfamate, the step which comprises converting a tertiary amine sulfamate to ammonium sulfamate by reaction with an equimolecular quantity of anhydrous ammonia.

JONAS KAMLET.

REFERENCES CITED

The following references are of record in the file of this patent:

UNITED STATES PATENTS

| Number | Name | Date |
|---|---|---|
| 1,835,841 | Beckett | Dec. 8, 1931 |
| 2,232,241 | Jones | Feb. 18, 1941 |
| 2,390,648 | Hill et al. | Dec. 11, 1945 |
| 2,408,823 | Tauch | Oct. 8, 1946 |
| 2,426,420 | Tauch | Aug. 26, 1947 |
| 2,436,658 | McQuaid | Feb. 24, 1948 |

OTHER REFERENCES

Groggins, "Unit Processes In Organic Synthesis," 2nd ed., pp. 234, 235, 261 and 262, McGraw-Hill (1938).